(12) United States Patent
Nagasaka

(10) Patent No.: US 7,384,202 B2
(45) Date of Patent: Jun. 10, 2008

(54) OPTICAL MODULE

(75) Inventor: Kimio Nagasaka, Hokuto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/620,816

(22) Filed: Jan. 8, 2007

(65) Prior Publication Data
US 2007/0177844 A1    Aug. 2, 2007

(30) Foreign Application Priority Data
Jan. 27, 2006   (JP) .............................. 2006-018724

(51) Int. Cl.
*G02B 6/36* (2006.01)
(52) U.S. Cl. .................... 385/88; 385/14; 385/40; 385/73; 385/89; 385/137
(58) Field of Classification Search .................. 385/14, 385/40, 47, 53–94, 137, 139
See application file for complete search history.

(56) References Cited

U.S. PATENT DOCUMENTS

| | | | | |
|---|---|---|---|---|
| 5,555,331 A | * | 9/1996 | Billet et al. .................... 385/49 |
| 6,533,603 B1 | * | 3/2003 | Togami ....................... 439/372 |
| 6,623,173 B1 | * | 9/2003 | Grois et al. .................... 385/76 |
| 6,821,027 B2 | * | 11/2004 | Lee et al. ....................... 385/89 |
| 7,053,303 B2 | * | 5/2006 | McCarthy et al. ......... 174/68.3 |
| 7,118,293 B2 | | 10/2006 | Nagasaka et al. |
| 2006/0029338 A1 | * | 2/2006 | Rodriguez-Parada et al. . 385/94 |

FOREIGN PATENT DOCUMENTS

| | | |
|---|---|---|
| JP | 2003-207694 | 7/2003 |
| JP | 2004-093950 | 3/2004 |
| JP | 2004-246279 | 9/2004 |
| JP | 2004-279868 | 10/2004 |

* cited by examiner

*Primary Examiner*—Brian Healy
*Assistant Examiner*—Hung Lam
(74) *Attorney, Agent, or Firm*—Harness, Dickey & Pierce, P.L.C.

(57) ABSTRACT

An optical module includes: an optical plug that supports one end of an optical fiber; a receptacle unit having an optical element and a mounting surface to be abutted against the optical plug for optically coupling the optical plug and the optical element; and a holder having a leaf spring that forces the optical plug to the mounting surface of the receptacle unit, a window section for passing the optical fiber, and a fiber support section disposed at a position near the window section for affixing the optical fiber thereto, wherein the holder is engaged with the receptacle unit to connect the receptacle unit and the optical plug in one piece.

5 Claims, 3 Drawing Sheets

OPTICAL MODULE

The entire disclosure of Japanese Patent Application No. 2006-018724, filed Jan. 27, 2006 is expressly incorporated by reference herein.

BACKGROUND

1. Technical Field

The present invention relates to optical modules that are used for optical communications.

2. Related Art

As a typical example of an optical module that is used for optical communications optical module, an optical module described in Japanese laid-open patent application JP-A-2003-207694 (patent document 1) is known. The optical module described in the above document uses a structure in which an optical fiber connector with an array of optical fibers being bonded thereto is pushed toward a package by a clamp thereby affixing the optical fiber connector to the package.

However, in the optical module described above, the optical fiber connector, the clamp and the package are composed as separate and independent members, such that the work in assembling these members is complex. Also, when an external force (such as, a force to pull up) is applied to the optical fibers, positions between the optical fiber connector, the clamp and the package would likely be shifted from one another, which may lower the optical coupling efficiency.

SUMMARY

In accordance with an advantage of some aspects of the present invention, it is possible to provide an optical module that can be readily assembled, and suppress a reduction in the optical coupling efficiency due to positional shifts among components of the optical module.

An optical module in accordance with an embodiment of the invention includes: an optical plug that supports one end of an optical fiber; a receptacle unit having an optical element and a mounting surface to be abutted against the optical plug for optically coupling the optical plug and the optical element; and a holder having a leaf spring that forces the optical plug to the mounting surface of the receptacle unit, a window section for passing the optical fiber, and a fiber support section disposed at a position near the window section for affixing the optical fiber thereto, wherein the holder is engaged with the receptacle unit to connect the receptacle unit and the optical plug in one piece.

By the structure described above, as the optical fiber is affixed by the fiber support member, the optical plug and the holder secure some degree of freedom in mutual positioning, and can be handled together. Accordingly, the work in assembling the optical plug and the receptacle unit by the holder becomes easier. Also, as the optical fiber is affixed to the holder, the optical plug that supports one end of the optical fiber would not be substantially shifted. Therefore, a reduction in the optical coupling efficiency due to positional shift between the optical plug and the receptacle unit can be suppressed.

Preferably, the fiber support member may include a plate section and adhesive that bonds the plate section and the optical fiber.

By this, the optical fiber can be more securely affixed to the holder.

Preferably, the plate section of the fiber support section may be disposed in contact with a side of the window section.

As a result, the optical fiber can be affixed at a position close to the window section.

DESCRIPTION OF EXEMPLARY EMBODIMENTS

Preferred embodiments of the invention are described below with reference to the accompanying drawings.

Figure 1:
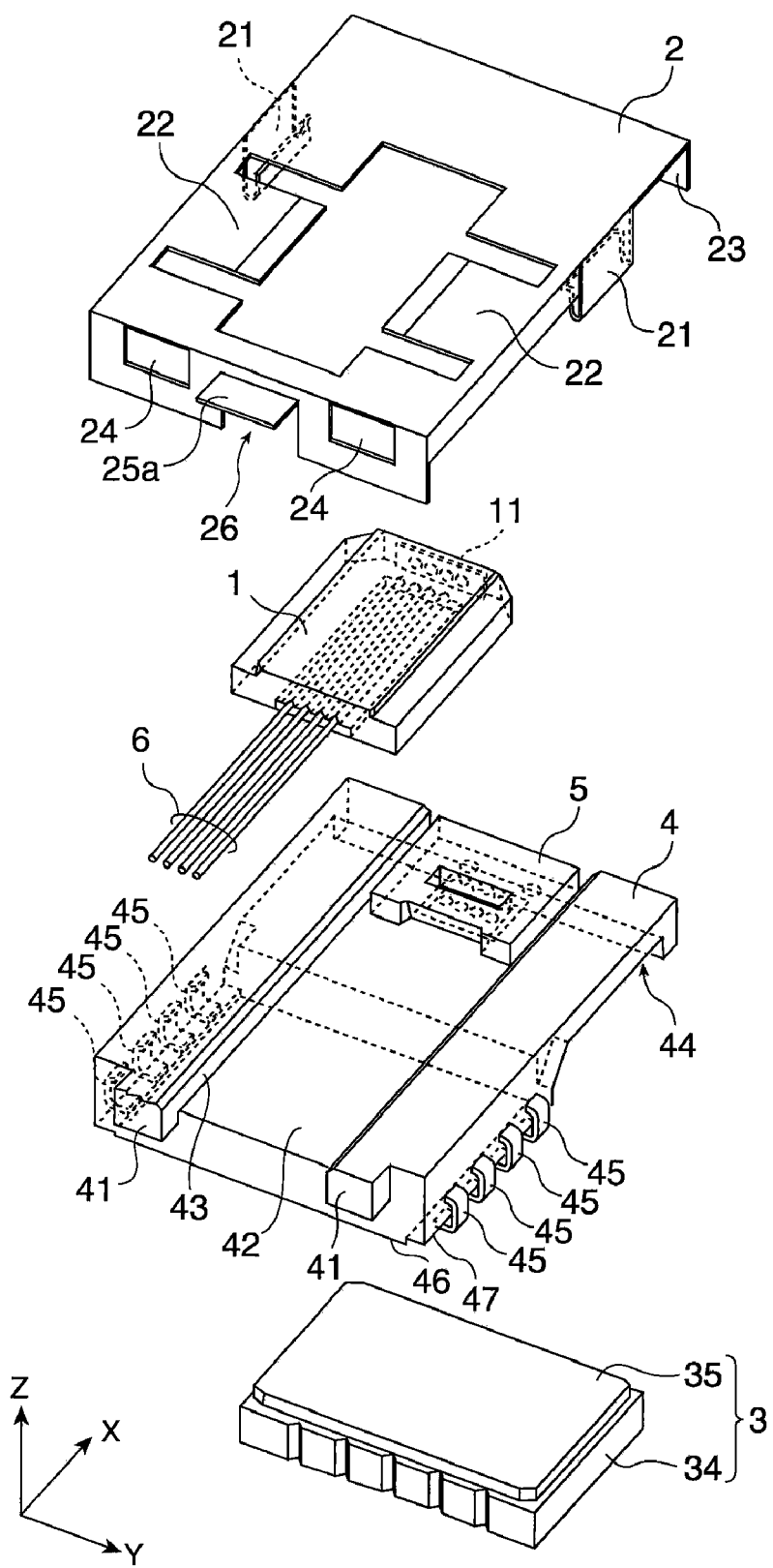
FIG. 1 is an exploded perspective view of the overall structure of an optical module in accordance with an embodiment of the invention.
Figure 2:
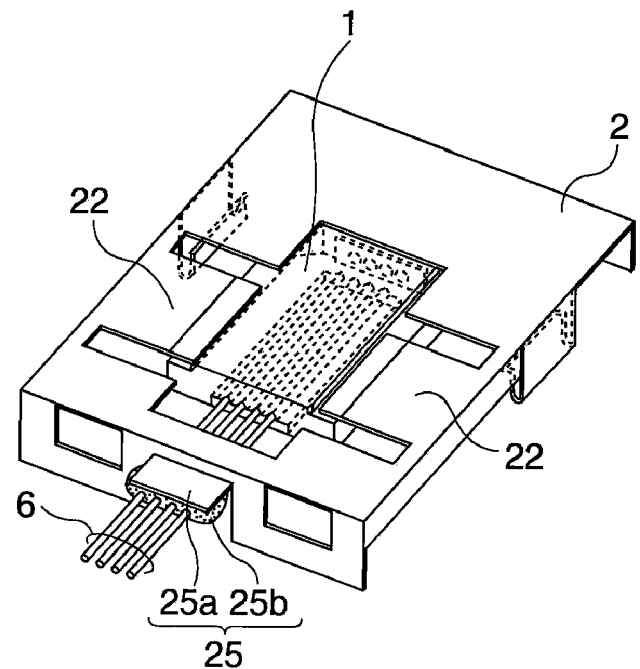
FIG. 2 is an exploded perspective view of the structure of the optical module showing a plug unit and a receptacle unit separated from each other.
Figure 2:
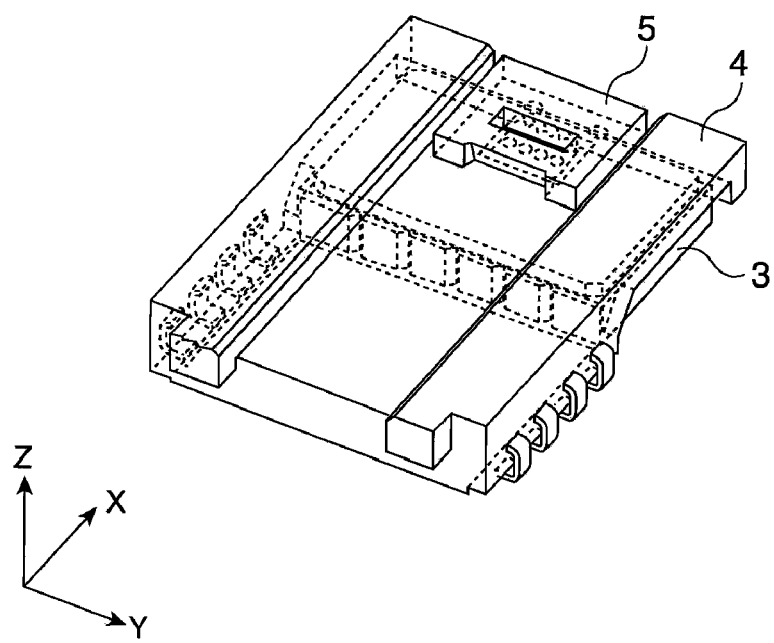
Figure 3:
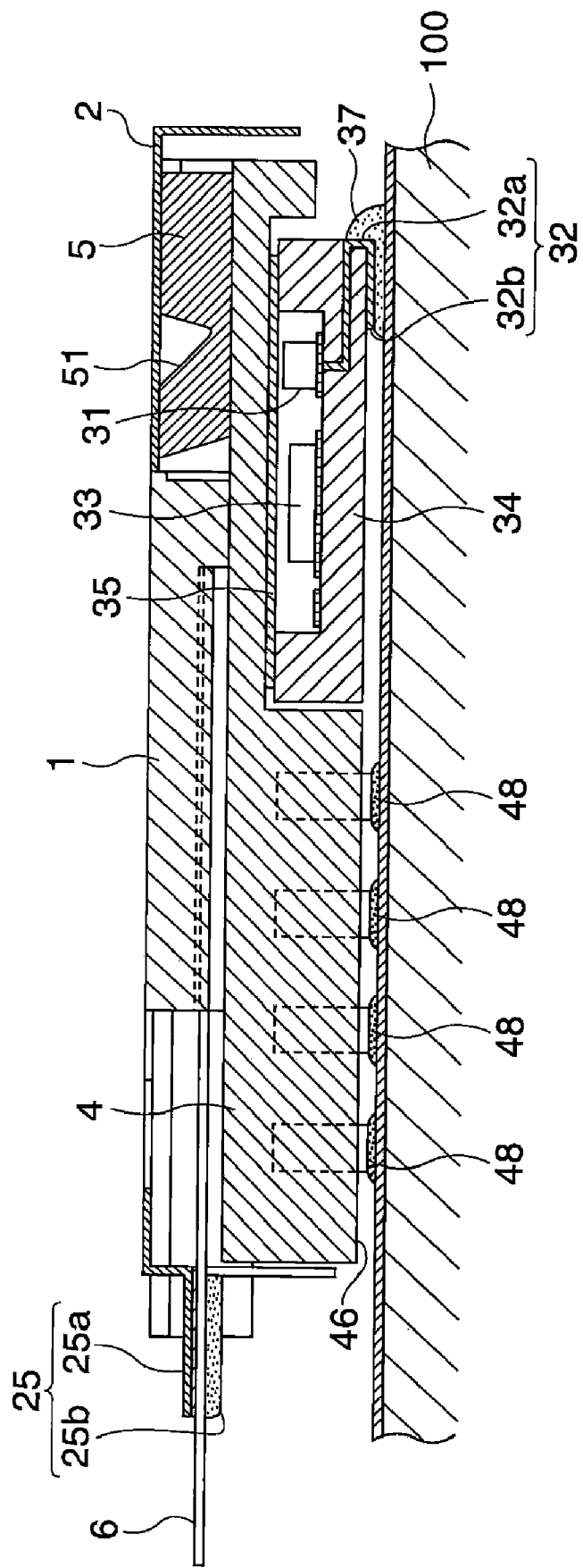
FIG. 3 is a cross-sectional view of the optical module taken along a direction in which the optical fiber extends.

FIG. 1 is an exploded perspective view of the overall structure of an optical module in accordance with an embodiment of the invention. FIG. 2 is an exploded perspective view of the structure of the optical module showing a plug unit and a receptacle unit separated from each other. FIG. 3 is a cross-sectional view of the optical module taken along a direction in which the optical fiber extends. The optical module in accordance with the present embodiment shown in FIGS. 1-3 is an optical module that is disposed on a substrate (circuit substrate) equipped with, for example, an electrical circuit, and is formed from an optical plug 1, a clamp (holder) 2, a ceramic package 3, a resin package 4, and an optical block 5. The optical plug 1 and the clamp 2 jointly form a plug unit; and the ceramic package 3, the resin package 4 and the optical block 5 jointly form a receptacle unit.

The optical plug 1 supports one end of the optical fiber 6. The optical plug 1 may be formed by, for example, resin injection molding. The optical plug 1 has V-letter shaped grooves and a plate member that covers the grooves. One ends of the optical fibers 6 are disposed in the V-letter shaped grooves, and the ends of the optical fibers are pressed by the plate member, thereby supporting the optical fibers 6. Also, the optical plug 1 has a focusing lens 11 disposed on an optical axis of the optical fiber 6. In the example shown in the figure, a plurality of focusing lenses 11 are provided at one end side of the optical plug 1 in its longitudinal direction.

The clamp 2 is disposed in a manner to surround the entire body of the receptacle unit, thereby join the optical plug 1 and the receptacle unit in one piece. The clamp 2 may be formed, for example, from a metal plate that is punched out and bent by a press machine. The clamp 2 is equipped with generally J-letter shaped hooks 21 on its side surfaces, leaf springs 22, engagement holes 24, a fiber support member 25 and a window section 26. The clamp 2 is engaged with the receptacle unit, thereby joining the receptacle unit and the optical plug 1 together in one piece.

The hooks 21 engage with latch sections 44 of the resin package 4. By this, the receptacle unit and the plug unit are joined together in one piece.

The leaf spring 22 may be formed through cutting an upper portion of the clamp 2 in a generally H-letter shape. The leaf springs 22 force end sections of the optical plug 1 in its longitudinal direction toward a mounting surface 42 of the resin package 4. By this, the optical plug 1 is brought in tight contact with the resin package 4.

A light shield section 23 is disposed at a tip end side of the clamp 2, in a manner to intersect the optical axis of the optical fiber 6. The light shield section 23 is a plate portion formed by bending a portion of the clamp 2 as illustrated. The light shield section 23 prevents laser light emitted from the optical plug 1 from leaking outside, when the plug unit is not coupled with the receptacle unit.

The engagement holes 24 are provided in a plate portion that is formed by bending a portion of the clamp 2 at its rear end side. Two engagement holes 24 are provided in the present example. The engagement holes 24 function to retain the receptacle unit and the plug unit in one piece by engaging with engaging pins (protruded sections) 41 provided on the resin package 4, respectively.

The fiber support section 25 is formed by bending a portion of the plate portion of the clamp 2 at its rear end side. The fiber support section 25 in the present example is interposed between the two engagement holes 24 generally at the center of the read end side of the clamp 2. When the optical plug 1 is covered by the clamp 2, the optical fiber 6 is disposed at the fiber support section 25. The fiber support section 25 in accordance with the present embodiment includes a plate section 25a disposed in contact with one side of the window section 26, and adhesive 25b that bonds the plate section 25a and a portion of the optical fiber 6, as shown in the figure.

The window section 26 is formed by cutting a portion of a plate section that is formed by bending a portion of the clamp 2 on its end side. The window section 24 of the present example is interposed between the engagement holes 24. It is noted that the window section 26 of the present example has one side (at a lower end side) that is open, but this side may be closed. When one side of the window is open, the optical fiber 6 can be more readily disposed in the fiber support section 25, when the optical plug 1 and the clamp 2 are joined together.

The ceramic package 3 stores the optical element 31 (see FIG. 3), and has an electrode 32 that is electrically connected to the optical element 31. More specifically, the ceramic package 3 is formed with ceramics material, and is equipped with a box shaped member 34 having a recessed section for disposing the optical element 31, the circuit chip 33 and the like, and a transparent plate (a glass plate) 35 disposed on the upper side of the box shaped member 34 in a manner to cover the aforementioned recessed section. The box shaped member 34 and the transparent plate 35 seal up the optical element 31 and the circuit chip 33.

The optical element 31 is a light emission element (for example, a VCSEL) that outputs optical signals, or a photodetecting element that receives optical signals. The optical element 31 is disposed with its optical axis being generally perpendicular to the transparent plate 35, and outputs optical signals through the transparent plate 35 or receives optical signals.

The circuit chip 33 may be a driver that drives the optical element 31, when the optical element 31 is a light emission element; and may be an amplifier that amplifies electrical signals outputted from the optical element 31, when the optical element 31 is a photodetecting element. In the present example, the optical element 31 and the circuit chip 33 are connected by wire bonding.

The electrode 32 is formed in a manner that a part thereof is exposed outside, and is connected to the optical element 31 and the circuit chip 33 through wirings that pass through the box shaped member 34. The electrode 32 shall be described in greater detail below.

The resin package 4 functions to support and position the optical plug 1, and is disposed along the optical axis direction of the optical fiber 6, juxtaposed with the ceramic package 3. The resin package 4 is equipped with the engaging pins 41 described above, the guide surfaces 42 and 43, the latch sections 44 and a plurality of lead electrodes 45. The resin package 4 can be fabricated by, for example, transfer molding with thermosetting type resin such as epoxy resin. When an epoxy resin material mixed with glass fine particles or fibers is used, the dimensional accuracy can be increased, and precise guide surfaces can be formed.

The optical plug 1 is mounted on the guide surface (i.e., the mounting surface) 42. In the present embodiment, the guide surface 42 is formed to be generally in parallel with the surface of the circuit substrate 100 when the optical module is disposed on the circuit substrate 100.

The guide surface 43 is formed such that the guide surface 43 is disposed generally orthogonal to the guide surface 42. The guide surface 43 contacts the side surface of the optical module. The optical module is positioned by the guide surface 43, the guide surface 42, the leaf spring 22, and the optical block 5.

The plural lead electrodes 45 are provided with a part thereof enclosed by the resin package, and in a manner to protrude toward the lower surface (second surface) 46 that is to be opposed to the circuit substrate 100 of the resin package 4. In the present embodiment, four lead electrodes 45 are provided on each of the sides of the resin package 4 along its longitudinal direction. Also, in accordance with the present embodiment, the lead electrodes 45 are not used for securing electrical connection, but instead used for joining and affixing the resin package 4 onto the circuit substrate 100. It is noted however that the lead electrodes 45 may also be used to secure electrical connection.

The optical block 5 has a light reflection surface 51 that is disposed at an intersection between the optical axis of the optical element 31 and the optical axis of the optical fiber 6, The optical block 5 is disposed on the guide surface 42 of the resin package 4. Also, the optical block 5 is composed of light transmissive resin, and has a sloped surface by cutting a portion of the resin, wherein the sloped surface functions as a light reflection surface 5. More concretely, optical signals outputted from the optical element 31 are focused by the focusing lens formed at the lower surface of the optical block 5, reflected by the light reflection surface 51, and enter one end of the optical fiber 6. Also, optical signals outputted from the optical fiber 6 are reflected by the light reflection surface 51, focused by the focusing lens described above, and reach the optical element 31.

Next, a state in which the optical module is mounted on the circuit substrate 100 is described in detail.

The electrode 32 provided at the ceramic package 3 has, as shown in FIG. 3, an exposed portion 32a provided on the side surface of the ceramic package 3, and a pad section 32b provided on the lower surface of the ceramic package 3. In the present embodiment, each of the electrodes 32 is provided in a plane orthogonal to an extending direction of the optical fiber 6 mounted on the optical module of the ceramic package 3 (i.e., in a plane in parallel with YZ plane). Also, the electrodes 32 are electrically connected and mechanically affixed to connection pads or the like on the circuit substrate 100 through solder 37. More specifically, as shown in FIG. 3, each of the electrodes 32 is bonded to the circuit substrate 100 in a manner that both of the exposed portion 32a and the pad section 32b are in contact with the solder 37. It is noted that either the exposed portion 32a or the pad section 32b alone may be in contact with the solder.

Each of the lead electrodes 45 of the resin package 4 is formed in a generally L-letter shape as shown in FIG. 1, and provided along the side surface 47 and the lower surface (second surface) 46 of the resin package 4. Also, as shown in FIG. 2 in broken lines, a portion of the lead electrode 45 is included in the resin package 4. As shown in FIG. 3, each of the lead electrodes 45 is mechanically affixed to a connection pad or the like on the circuit substrate 100 through solder 48 at the portion of the lead electrode protruding on the lower surface 46 of the resin package 4.

According to the embodiment described above, as the optical fiber is affixed by the fiber support member, the optical plug and the holder secure some degree of freedom in mutual positioning, and can be handled together. Accordingly, the work in assembling the optical plug and the receptacle unit by the holder becomes easier. Also, as the optical fiber is affixed to the holder, the optical plug that supports one end of the optical fiber would not be substantially shifted. Therefore, a reduction in the optical coupling efficiency due to positional shift between the optical plug and the receptacle unit can be suppressed.

It is noted that the invention is not limited to the details of the embodiment described above, and many changes can be made and implemented within the scope of the subject matter of the invention.

What is claimed is:

1. An optical module comprising:
   an optical plug that supports one end of an optical fiber;
   a receptacle unit having an optical element and a mounting surface to be abutted against the optical plug for optically coupling the optical plug and the optical element, the receptacle unit including plural lead electrodes for joining the receptacle unit onto a circuit substrate; and
   a holder having a leaf spring that forces the optical plug to the mounting surface of the receptacle unit, a window section for passing the optical fiber, and a fiber support section disposed at a position near the window section for affixing the optical fiber thereto, the holder being engaged with the receptacle unit to connect the receptacle unit and the optical plug in one piece at sides of the receptacle unit.

2. An optical module according to claim 1, the holder including a fiber support member, the fiber support member including a plate section and adhesive that bonds the plate section and the optical fiber.

3. An optical module according to claim 2, the plate section of the fiber support member being disposed in contact with a side of the window section.

4. An optical module according to claim 1, the window section being formed by cutting a portion of a plate section that is formed by bending a portion of holder.

5. An optical module according to claim 1, the window section being interposed between engagement holes.

* * * * *